F. M. HOLMES.
TEMPERATE DRINKING FOUNT.
APPLICATION FILED FEB. 15, 1919.

1,357,868.

Patented Nov. 2, 1920.
2 SHEETS—SHEET 1.

WITNESS:
O. S. Whiteman
F. M. Rader

INVENTOR:
Frank M. Holmes,
BY
E. T. Silvius,
ATTORNEY.

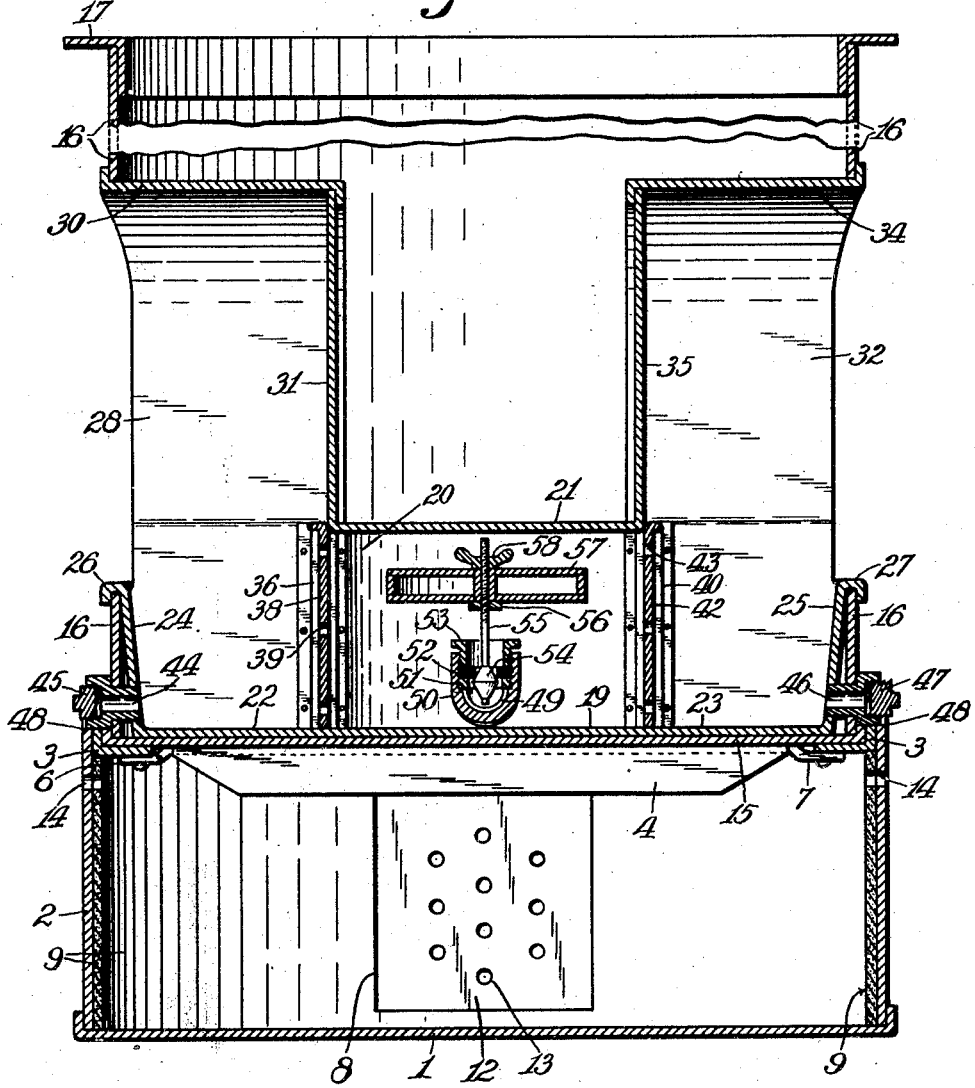

UNITED STATES PATENT OFFICE.

FRANK M. HOLMES, OF CRAWFORDSVILLE, INDIANA, ASSIGNOR TO MILLER VEHICLE HEATER COMPANY, OF CRAWFORDSVILLE, INDIANA, A CORPORATION OF INDIANA.

TEMPERATE DRINKING-FOUNT.

1,357,868.  Specification of Letters Patent.  Patented Nov. 2, 1920.

Application filed February 15, 1919. Serial No. 277,145.

*To all whom it may concern:*

Be it known that I, FRANK M. HOLMES, a citizen of the United States, residing at Crawfordsville, in the county of Montgomery and State of Indiana, have invented a new and useful Temperate Drinking-Fount, of which the following is a specification, reference being had to the accompanying drawings, and to the letters and figures of reference marked thereon.

This invention relates to a portable water-tank and drinking-fount combined, and is of that type which is designed to supply a small cavity or chamber with water automatically when each animal or fowl is drinking, the invention having reference more particularly to a drinking-fount that is designed to supply water during cold seasons at a moderate temperature.

An object of the invention is to provide a drinking-fount for animals and fowls that shall be so constructed as to be efficient in supplying palatably cool water in summer time and water of moderate temperature that may not be detrimental to health in the cold season of the year.

Another object is to provide an improved drinking-fount that shall be so constructed as to permit of being readily cleansed to be sanitary, particularly when used by swine.

A further object is to provide a drinking-fount for animals which shall be so constructed as to be readily adapted in the process of construction to have two or more cavities or chambers from which animals or fowls may drink, and without requiring separate feeding appliances for the different cavities or chambers; which drinking-fount shall be so constructed as to be durable and economical in use and inexpensive for maintenance.

With the above-mentioned and other objects in view, the invention consists in a tank or main reservoir having a relatively small reservoir therein protected from the effects of the external atmosphere to directly feed water to a drinking cavity or chamber and permitting circulation of the water so that it shall be tempered, and means for heating the smaller reservoir; and, the invention consists also further in the parts and combinations and arrangements of parts as hereinafter particularly described and further defined in the accompanying claims.

Figure 1:
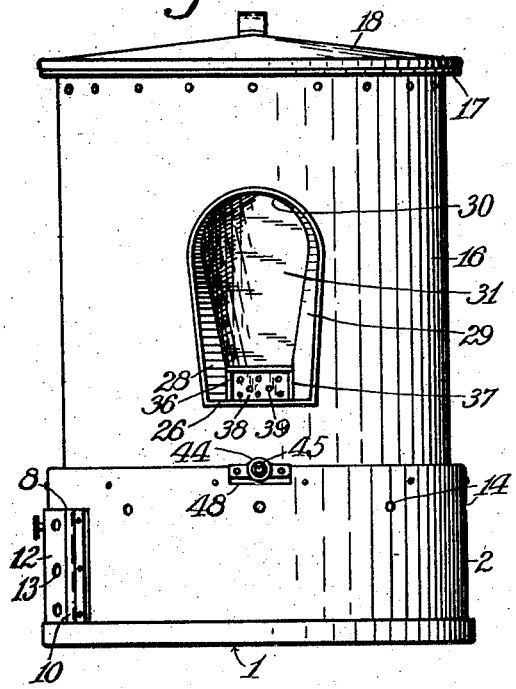
Figure 3:
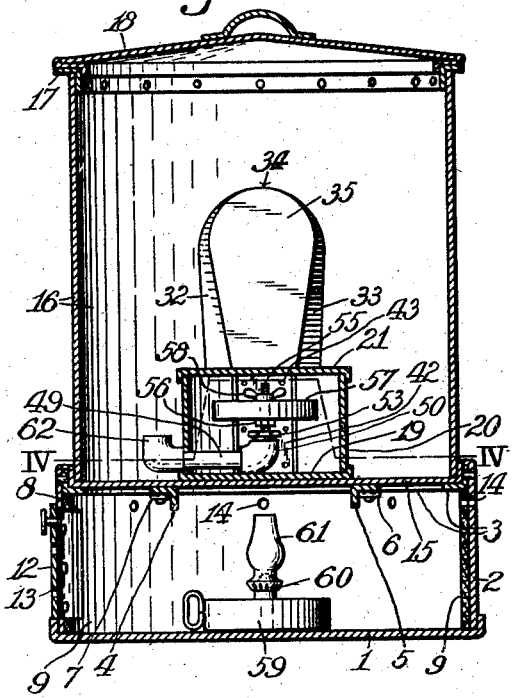
Figure 2:
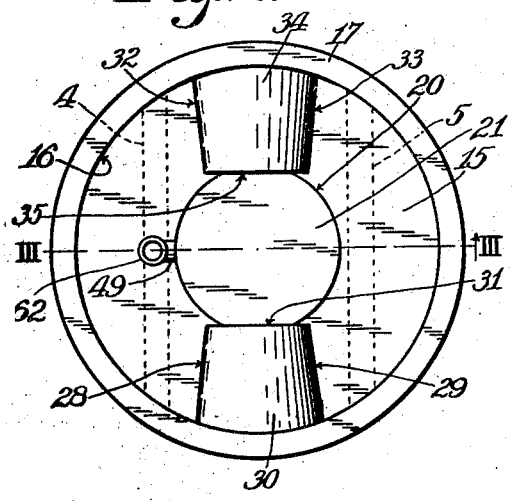
Figure 4:
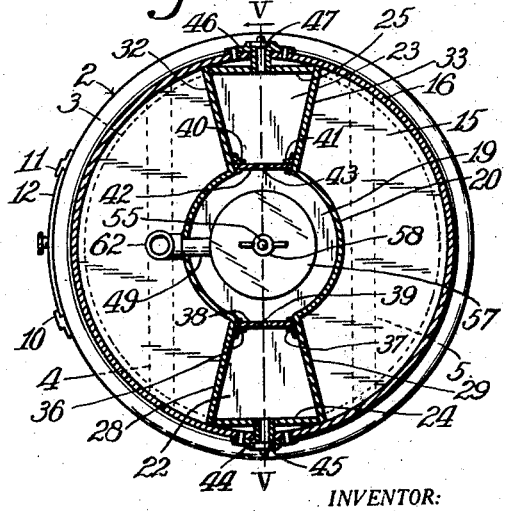

Referring to the drawings,—Figure 1 is an elevation of the improved drinking-fount as preferably constructed; Fig. 2 is a top plan of the drinking-fount minus its cover; Fig. 3 is a vertical sectional elevation approximately on the line III—III in Fig. 2; Fig. 4 is a horizontal section approximately on the line IV—IV in Fig. 3; and, Fig. 5 is a vertical section of the drinking-fount minus its cover approximately on the line V—V in Fig. 4, on an enlarged scale, the upper porton of the tank or main reservoir being broken away.

Similar reference characters indicate like elements or features of construction in the different figures of the drawings.

The improved drinking-fount is provided with a suitable supporting base which preferably comprises a bottom 1 and a side wall 2, the upper portion of the latter being designed to directly support the tank and, for this purpose a supporting ring 3 composed of L-section angle-iron is secured to the inner side of the wall 2 and so arranged that a supporting ledge is afforded, and also an upwardly extending rim to retain the tank in place. Preferably two beams 4 and 5 are secured to the supporting ring to support the middle portion of the bottom of the tank, each beam preferably having downwardly off-set end portions 6 and 7 secured to the under side of the ring 3. One portion of the base wall 2 has a doorway 8 therein and, preferably, the wall has a fiber lining 9. The exterior of the wall 2 has vertical guides 10 and 11 adjacent to the doorway in which a door 12 having apertures 13 is arranged, preferably so that the door may be lifted from the guides. The apertures permit entrance of air to support combustion within the hollow base, and the upper portion of the wall 2 has apertures 14 for the escape of fumes or smoke.

The tank or main reservoir comprises a bottom 15 and a side wall 16 having a suitable top ring 17 on which a cover 18 is removably placed. The bottom 15 is removably placed upon the supporting ring 3 of the base. The smaller reservoir is arranged upon the middle portion of the bottom 15 and preferably is a structurally separate unit having a bottom 19, a circular wall 20 and a closure top 21. Any suitable number of chambers from which to drink may be connected with the smaller or inner reservoir; and, when two chambers or cavities are desired two chamber bottoms 22 and 23 are made integrally with the bottom 19, and front wall portions 24 and 25 extend upwardly from the bottom portions 22 and 23 respectively into suitable openings in the wall 16, and have turned-over cap-portions 26 and 27 respectively that cover the tops of the wall portions 16 at the bottoms of said openings, the wall portions 24 and 25 preferably being inclined as indicated in Fig. 5. One drinking cavity has side walls 28 and 29 connected with the bottom 22 and the front portion 24 and also with the wall 20, the latter having an opening therein to afford communication between the inner reservoir and the drinking cavity. The side walls extend upward beyond the top of the inner or smaller reservoir and an arched top 30 is connected to the walls, a back wall 31 being connected to and extending upward from the top 21 and, being connected to the walls 28 and 29 and the top 30, a recess is provided to permit free movement of an animal's head when drinking; the walls of the recess constituting inset portions of the wall of the tank to retain the water in the tank. Likewise the other of the two cavities has side walls 32 and 33, a top 34 and a back wall 35, the wall 20 having an opening therein between the side walls.

For sanitary purposes suitable screens are provided to prevent dirty substances from flowing from the drinking cavities to the central reservoir, and preferably guides 36 and 37 are arranged on the inner sides of the walls 28 and 29 and removably hold a screen plate 38 having apertures 39 for the passage of water; and similarly, the walls 32 and 33 are provided with guides 40 and 41 which hold in place a screen plate 42 having apertures 43. In order to readily cleanse the drinking cavities a tube 44 is placed in the front wall portion 24 and extends through the adjacent portion of the wall 16 and has a stopper 45 connected thereto, a tube 46 being inserted in the wall portions 16 and 25 and provided with a stopper 47, the wall 2 having a recess 48 to accommodate each stopper.

In order to automatically admit water from the tank or main reservoir to the smaller or inner reservoir, a suitable float-controlled valve is provided and may suitably comprise a pipe 29 secured in a suitable opening in the wall 20, and having a pipe elbow 50 thereon arranged so as to have an opening in its upper portion in which a seat ring 51 is secured that supports a rubber or rubber composition valve seat ring 52, secured in place by a bush 53 which is screwed into the upturned angle of the elbow. A valve 54 is arranged in the elbow so as to engage the under portion of the flexible ring 52 and close the opening therein, the valve having a stem 55 extending upward through the bush and having an adjusting nut 56 thereon. A suitable float 57 is arranged on the stem 55 and seated upon the nut 56 and is secured in place by a nut 58 on the stem, so that the height of the float may be varied to vary the level of the water in the feed reservoir and the drinking chambers or cavities.

For the purpose of heating the water in cold weather, more especially that in the inner or feeding reservoir, a suitable heater is provided to supply heat to the bottom of the tank, and in ordinary cases comprises a lamp which has an oil reservoir 59, a burner 60 and a chimney 61, the lamp being placed upon the bottom 1 of the base.

For the purpose of permitting ready repairs of the controlling valve suitable provision is made for closing the outer end of the feed pipe 49 to prevent escape of water from the main reservoir while repairs are being made; and in interest of simplicity an elbow 62 preferably is secured to the pipe 49 outside of the inner reservoir and arranged with its open end uppermost so that a stopper may readily be inserted therein from the top of the tank. When the screen plate 38 or 42 is removed the float 57 may be removed through either of the drinking cavities or chambers.

In practical use, when the cover 18 is removed the tank may be quickly filled with water which will flow through the elbow 62 and the pipe 49 and, the valve 54 being in lowered position, the water will flow through the seat ring 52 until the water in the feed reservoir and the drinking cavities rises to the desired level and lifts the float 57 which carries the valve up to its seat and stops the flow. In warm weather the water in the inner reservoir remains relatively cooler than that in the drinking cavities, and circulation being naturally induced the cooler water flows out to the drinking cavities while the warmer water is cooled in the inner reservoir. In cold weather the heat is provided which slightly warms the water in the inner reservoir, and circulation being set up the drinking cavities are automatically supplied with relatively warm water in their upper portions while the cooler water passes to the lower portion of the inner reservoir and becomes temperately warmed. When the drinking cavities require cleansing a stopper, which may be composed of a wooden rod, is inserted in the elbow 62, after which the stoppers 45 and 47 are removed and the foul water drained from the cavities. On removal of the stopper from the elbow 62 the water is again supplied to the drinking cavities as before and will be automatically supplied by the controlling valve 54 and its controlling float when the animals or fowls drink some of the water in the drinking cavities.

Having thus described the invention, what is claimed as new is—

1. A drinking-fount including a tank having a bottom and a side wall, the side wall having an opening therein, a feed-reservoir upon the tank bottom remote from the side wall and having an aperture in its side, a drinking-chamber structure also upon the tank bottom and having side walls connected to the tank side wall adjacent to the opening therein and also connected to the feed-reservoir side adjacent to the aperture therein, and a feed-duct in the lower portion of the feed-reservoir side.

2. A drinking-fount including a tank having a bottom and a side wall, the side wall having an opening therein, a closed-top feed-reservoir upon the tank bottom remote from the side wall and having an aperture in its side, a drinking-chamber structure also upon the tank bottom and having two upright side walls connected to the feed-reservoir side adjacent to the aperture therein and extending upward beyond the feed-reservoir, the upright side walls being connected also to the tank side wall adjacent to the opening therein, an arched top connected to the upright side walls, and a back wall connected to the top of the feed-reservoir and also to the upright side walls and the arched top.

3. A drinking-fount including a tank having a flat bottom and a side wall, the side wall having an opening therein at a distance above said bottom, a closed top feed-reservoir having a bottom upon the tank bottom remote from said wall, the feed-reservoir bottom having an integral extension projecting nearly to the tank side wall, said extension having a front wall portion thereon extending upward and to the tank wall at the bottom of the opening therein and secured to said wall, two upright side walls connected to the feed-reservoir side adjacent to the aperture therein and also connected to said bottom extension, the upright side walls being connected also to said front wall portion and to said tank wall adjacent to the opening therein, an arched top connected to the upright side walls, and a back wall connected to the upright side walls and the arched top and also to the upper portion of the feed-reservoir structure.

4. In a drinking-fount, the combination of a base comprising a side wall, a ledge member having a vertical portion secured to the inner side of the side wall adjacent to the top thereof, said member having a projecting horizontal portion at the bottom of the vertical portion, two beams secured to the horizontal portion of the ledge member, a tank having a bottom supported upon the horizontal portion of the ledge member and the two beams, and against said vertical portion, and a feed-reservoir and a drinking-chamber having integrally connected bottoms and seated upon the bottom of the tank.

5. In a drinking-fount, the combination of a tank bottom and a tank side wall thereon, said side wall having an opening therein at a distance above said bottom, a feed-reservoir and a drinking chamber having vertical walls connected together and having each a bottom upon the tank bottom, said vertical walls being connected to the tank side wall adjacent to the opening therein, a chamber-front wall connected to said vertical walls and to the tank side wall below said opening, a perforated screen plate arranged between said vertical walls at the feed-reservoir, a conduit connecting the lower portion of the feed-reservoir with the lower portion of the interior of the tank and having a controlling valve, a drain-tube secured in the said front wall of the drinking-chamber and also in the tank side wall, and stopper connected to the drain-tube.

6. In a drinking-fount, the combination with a tank bottom, of a tank side wall secured to the tank bottom and having an opeing therein at a distance above said bottom, a feed-reservoir and a drinking-cavity having bottoms integrally connected together and secured to the tank bottom, the drinking-cavity having two side walls and a back wall extending upward beyond the top of the feed-reservoir and an arched top connected to the two side walls and the back wall, said side walls and top being connected to the tank side wall at the sides and the top of the opening therein, the lower portion of said back wall being a removable partitional part and having apertures therein and being arranged between the feed-reservoir and the drinking cavity, said drinking-cavity having a low front wall connected to the tank side wall at the bottom of the opening therein.

7. In a drinking-fount, the combination of a tank comprising a bottom and a tank side wall, said wall having an opening therein, a feed-reservoir upon the tank bottom and having an aperture in its side, a drinking-chamber structure also upon the tank bottom and connected to the tank side wall adjacent to the opening therein, the sides of said structure being connected to the feed-reservoir side adjacent to said aperture, an inlet pipe extending through the side of the feed-reservoir and having an inlet end outside the feed-reservoir adapted to be closed, an elbow in the feed-reservoir and connected to the inlet pipe, and means to close or open the end of said elbow.

In testimony whereof, I affix my signature in presence of two witnesses.

FRANK M. HOLMES.

Witnesses:
NORA WARD,
CHARLES M. McCABE.